United States Patent
Yen et al.

(10) Patent No.: US 10,727,746 B1
(45) Date of Patent: Jul. 28, 2020

(54) MULTI-PHASE DC-DC POWER CONVERTER AND DRIVING METHOD OF THE SAME

(71) Applicant: ANPEC ELECTRONICS CORPORATION, Hsinchu (TW)

(72) Inventors: Tzu-Yang Yen, Taipei (TW); Hsin-Tai Lin, Taichung (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 11 days.

(21) Appl. No.: 16/394,028

(22) Filed: Apr. 25, 2019

(30) Foreign Application Priority Data

Feb. 26, 2019 (TW) .............................. 108106405 A

(51) Int. Cl.
*H02M 3/158* (2006.01)
*H02M 1/084* (2006.01)
*H02M 1/00* (2006.01)

(52) U.S. Cl.
CPC ........... *H02M 3/158* (2013.01); *H02M 1/084* (2013.01); *H02M 2001/0025* (2013.01)

(58) Field of Classification Search
CPC .... H02M 3/155; H02M 3/157; H02M 3/1584; H02M 2001/0012; G05F 1/56; G05F 1/00; G05F 1/40
See application file for complete search history.

(56) References Cited

U.S. PATENT DOCUMENTS

| 2013/0257394 | A1 | 10/2013 | Wang |
| 2014/0176097 | A1* | 6/2014 | Huang ...................... G05F 1/59 323/272 |
| 2018/0337599 | A1* | 11/2018 | Chen ..................... H02M 3/158 |

FOREIGN PATENT DOCUMENTS

TW          201340570 A     10/2013

* cited by examiner

*Primary Examiner* — Thienvu V Tran
*Assistant Examiner* — Nusrat Quddus
(74) *Attorney, Agent, or Firm* — Li & Cai Intellectual Property (USA) Office

(57) ABSTRACT

A multi-phase DC-DC power converter includes an error amplifier, a comparator, a phase selection circuit, a plurality of phase circuits and a width detecting circuit. The plurality of phase circuits are each associated with a phase of the multi-phase DC-DC power converter, each including a turn-on clock generation circuit, a first switching transistor, a second switching transistor, an output inductor, and a control logic. In a load transition state, when the width detecting circuit detects that a comparison output signal exceeds a predetermined width, the phase selection circuit adjusts one of the plurality of phase signals based on a force trigger signal, and outputs, corresponding to a force trigger signal, one of the plurality of on-signals.

6 Claims, 7 Drawing Sheets

MULTI-PHASE DC-DC POWER CONVERTER AND DRIVING METHOD OF THE SAME

CROSS-REFERENCE TO RELATED PATENT APPLICATION

This application claims the benefit of priority to Taiwan Patent Application No. 108106405, filed on Feb. 26, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a multi-phase DC-DC power converter, and more particularly to a multi-phase DC-DC power converter for improving the voltage drop generated during a load transition.

BACKGROUND OF THE DISCLOSURE

The existing electronic systems employ multiple DC-to-DC converters to convert a main bus voltage from a power source supplying the system to one or more voltages necessary for driving integrated circuits in the electronic systems.

Switching regulators, also referred to as DC to DC converters, are used to convert an input supply voltage to a desired output voltage at a voltage level appropriate for integrated circuits in an electronic system.

When the power converter is operating, a transient response generated when a load changes can have an impact on the operational efficiency, depending on a control topology that the power converter used. Typically, by detecting an output voltage regulated by the power converter, the power converter can adjust certain characteristics associated with a switching operation to maintain the desired output voltage.

However, in a load transition state, although a signal width output from a comparator changes, however, in a control mechanism of the existing multi-phase DC power converter, a mode in which phase switching circuits are sequentially turned on is used to adjust the output voltage, thereby causing a voltage drop of the output voltage to be too large.

Therefore, how the above-mentioned issues can be overcome by improving the circuit design to reduce the voltage drop generated during the load transition has become one of the important topics to be solved in this field.

SUMMARY OF THE DISCLOSURE

In response to the above-referenced technical inadequacies, the present disclosure provides a multi-phase DC-DC power converter for reducing the voltage drop generated during the load transition.

In one aspect, the present disclosure provides a multi-phase DC-DC power converter, which includes an error amplifier, a comparator, a phase selection circuit, a plurality of phase circuits and a width detecting circuit. The error amplifier is configured to receive a reference voltage and a feedback voltage from an output voltage node, and amplify a difference signal of the feedback voltage and the reference voltage to output an error signal. The comparator is configured to receive and compare the error signal and a sawtooth signal to generate a comparison output signal. The phase selection circuit is configured to receive a plurality of turn-on signals and a comparison output signal, and is configured to separate the comparison output signal into a plurality of phase signals, and output the plurality of turn-on signals corresponding to the plurality of phase signals. The plurality of phase circuits are each associated with a phase of the multi-phase DC-DC power converter, each including a turn-on clock generation circuit, a first switching transistor, a second switching transistor, an output inductor, and a control logic. The turn-on clock generation circuit is configured to generate a turn-on clock signal in response to one of the plurality of phase signals, and the first switching transistor responsive to a switching signal and is coupled between an input voltage node and a phase node. The second switching transistor responsive to another switching signal and is coupled between the phase node and a ground node. The output inductor is coupled between the output voltage node and the phase node. The control logic is configured to generate, in response to the turn-on clock signal, the switching signals. The width detecting circuit is configured to detect a pulse width of the comparison output signal, and generate a force trigger signal when the pulse width of the comparison output signal exceeds a predetermined width. In a load transition state, when the width detecting circuit detects that the comparison output signal exceeds the predetermined width, the phase selection circuit adjusts one of the plurality of phase signals based on the force trigger signal, and outputs, corresponding to the force trigger signal, one of the plurality of turn-on signals.

In one aspect, the present disclosure provides a driving method of a multi-phase DC-DC power converter, the method includes: configuring an error amplifier to receive a reference voltage and a feedback voltage from an output voltage node, and amplifying a difference signal of the feedback signal and the reference voltage to output an error signal; configuring a comparator to receive and compare the error signal and a sawtooth signal to generate a comparison output signal; configuring a phase selection circuit to receive a plurality of turn-on signals and a comparison output signal, separate the comparison output signal into a plurality of phase signals, and output the plurality of turn-on signals corresponding to the plurality of phase signals; configuring each of a plurality of phase circuits to be associated with one of phases of the multiphase DC-DC power converter. The plurality of phase circuits each includes: a turn-on clock generation circuit configured to generate a turn-on clock signal in response to one of the plurality of phase signals; a first switching transistor responsive to a switching signal and coupled between an input voltage node and a phase node; a second switching transistor responsive to another switching signal and coupled between the phase node and a ground node; an output inductor coupled between the output voltage node and the phase node; and a control logic configured to generate, in response to the turn-on clock signal, the switching signals. The method further includes: configuring a width detecting circuit to detect a pulse width of the comparison output signal, and generate a force trigger signal when the pulse width of the comparison output signal exceeds a predetermined width; and when the width detecting circuit detects that the comparison output signal exceeds the predetermined width in a load transition state, configuring the phase selection circuit to adjust one of the plurality of phase signals based on the force trigger signal, and output, corresponding to the force trigger signal, one of the plurality of turn-on signals.

One of the advantages of the present disclosure is that the multi-phase DC-DC power converter and the driving method thereof provided by the present disclosure can greatly reduce a voltage drop during the load transition by detecting the pulse width of the comparison output circuit and adjusting a turn-on timing of the phase circuit.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
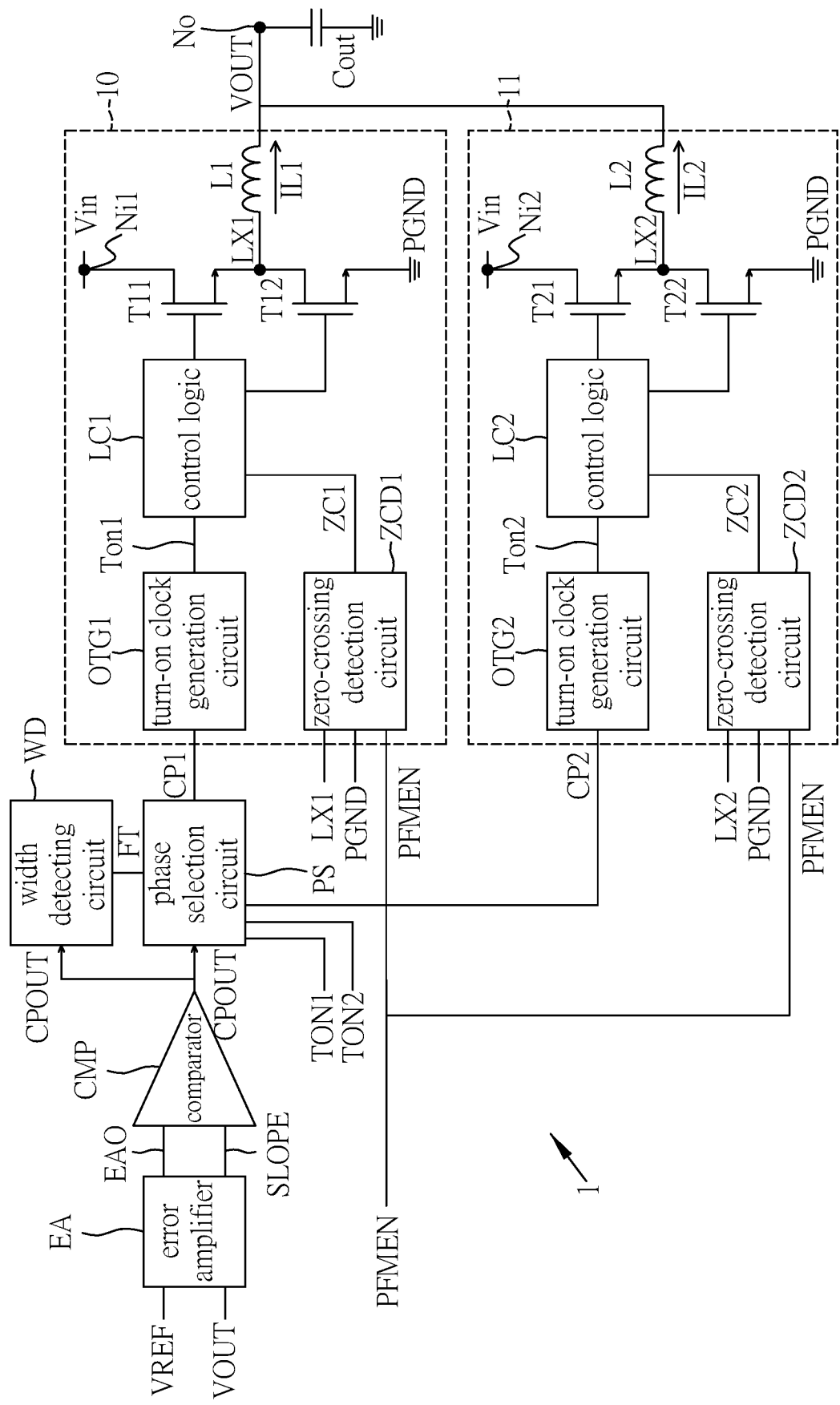
FIG. 1 is a circuit diagram of a multi-phase DC-DC power converter according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

FIG. 1 is a circuit diagram of a multi-phase DC-DC power converter according to an embodiment of the present disclosure. An embodiment of the present disclosure provides a multi-phase DC-DC power converter 1, which includes an error amplifier EA, a comparator CMP, a phase selection circuit PS, a plurality of phase circuits, and a width detecting circuit WD.

The error amplifier EA receives a reference voltage VREF and a feedback voltage from an output voltage node No, that is, an output voltage VOUT, and amplifies a difference signal between the output voltage VOUT and the reference voltage VREF to output an error signal EAO.

The comparator CMP receives and compares the error signal EAO with the sawtooth signal SLOPE to generate a comparison output signal CPOUT. For example, when a potential of the error signal EAO is greater than that of the sawtooth signal SLOPE, a voltage with high potential is output, for example 1, and when the potential of the error signal EAO is smaller than that of the sawtooth signal SLOPE, a voltage with low potential is output, for example 0, and thus a clock signal can be generated and can be used as a PWM control signal. It should be noted that in a load transition state, a pulse width of the output voltage VOUT will be changed since a voltage drop generated in the output signal VOUT.

The phase selection circuit PS receives a plurality of turn-on signals, such as turn-on signals TON1 and TON2, and the comparison output signal EAO, the phase selection circuit PS is configured to separate the comparison output signal CPOUT into a plurality of phase signals, such as a first phase signal CP1 and a second phase signal CP2. In the multi-phase power converter, input and output ripple currents and hot spots on printed circuit boards or specific components can be reduced since the phases are interleaved. In fact, the multi-phase power converter can reduce current consumptions of switching transistors and inductors by half, and the interleaved phases can also reduce conduction losses.

The plurality of phase circuits, such as a first phase circuit 10 and a second phase circuit 11, are each associated with one phase of the multi-phase DC-DC power converter 1. In the present embodiment, the multi-phase DC-DC power converter 1 is a two-phases DC-DC power converter and thus has two phase circuits. The first phase circuit 10 includes a turn-on clock generation circuit OTG1, a first switch transistor T11, a second switch transistor T12, an output inductor L1, a zero-crossing detection circuit ZCD1, and a control logic LC1.

The turn-on clock generation circuit OTG1 is configured to generate a turn-on clock signal Ton1 in response to the first phase signal CP1. The first switching transistor T11 is connected between an input voltage node Ni and a phase node LX1, and determines an on-state condition thereof in response to a switching signal from the control logic LC1. The second switching transistor T12 is connected between the phase node LX1 and a ground node PGND, and similarly determines an on-state condition in response to another switching signal from the control logic LC1. The output inductor L1 is connected between the output voltage node No and the phase node LX1.

The zero-crossing detection circuit ZCD1 is configured to detect, in response to a PFM activation signal PFMEN, whether a current of the phase node LX1 crosses a current zero point to generate a zero-crossing detection signal ZC1. In detail, the zero-crossing detection circuit ZCD1 monitors a voltage of the phase node LX1 and compares it with a voltage of the ground node PGND to confirm whether the current zero point is crossed, and the generated zero-crossing detection signal ZC1 can be used to allow the phase circuits to enter a PFM mode.

The control logic LC1 is configured to generate, in response to the turn-on clock signal Ton1 and the zero-crossing detection signal ZC1, the switching signals to determine the on-state conductions of the first switching transistor T11 and the second switching transistor T12. In other words, the first switching transistor T11 and the second switching transistor T12 are connected in series between an input voltage Vin and a ground voltage. The first switching transistor T11 and the second switching transistor T12 are selectable to be turned on and off to generate a switching output voltage at the phase node LX1. The switching output voltage is directly coupled to the LC filter circuit. The LC filter circuit includes an output inductor L1 and an output capacitor Cout, which produce an output voltage VOUT at the output voltage node No having a substantially constant amplitude. A load can then be driven with the output voltage VOUT.

On the other hand, the second phase circuit 11 includes a turn-on clock generation circuit OTG2, a first switch transistor 211, a second switch transistor T22, an output inductor L2, a zero-crossing detection circuit ZCD2, and a control logic LC2. A configuration of the second phase circuit 11 is basically similar to that of the components of the first phase circuit 10, and thus the repeated description is omitted. The turn-on clock generation circuit OTG2 correspondingly generates, in response to a second phase signal CP2, a turn-on clock signal Ton2. The first switching transistor T12 is connected between an input voltage node Ni2 and the phase node LX2, and the second switching transistor T22 is connected between the phase node LX2 and the ground node PGND. The first switching transistor T21 and the second switching transistor T22 determine their on-state conditions in response to a plurality of switching signals from the control logic LC2.

Similarly, the output inductor L2 is connected between the output voltage node No and the phase node LX2, and the zero-crossing detection circuit ZCD2 is configured to detect, in response to the PFM turn-on signal PFMEN, whether a current of the phase node LX2 crosses the current zero point to generate a zero-crossing detection signal ZC2. In detail, the zero-crossing detection circuit ZCD2 monitors a voltage of the phase node LX2 and compares it with the voltage of the ground node PGND to confirm whether the current zero point is crossed, and the generated zero-crossing detection signal ZC2 can be used to allow the phase circuits to enter the PFM mode.

The width detecting circuit WD is configured to detect a pulse width of the comparison output signal CPOUT, and generate a force trigger signal FT when the pulse width of the comparison output signal CPOUT exceeds a predetermined width. For example, the width detecting circuit WD may include a delay circuit.

Wherein, in the load transition state, for example, when the output voltage node No is connected to a load, the output voltage VOUT will be changed since a voltage drop generated in the output signal VOUT. Until the pulse width of the comparison output signal CPOUT exceeds a set predetermined width, the width detecting circuit WD generates the force trigger signal FT, such that the phase selection circuit PS adjusts, based on the forced trigger signal FT, one of the phase signals, such as the phase signal CP1 or CP2, and the phase selection circuit PS further outputs, corresponding to the forced trigger signal FT, one of the plurality of turn-on signals, for example, the turn-on signal Ton1 or Ton2.

Figure 2:
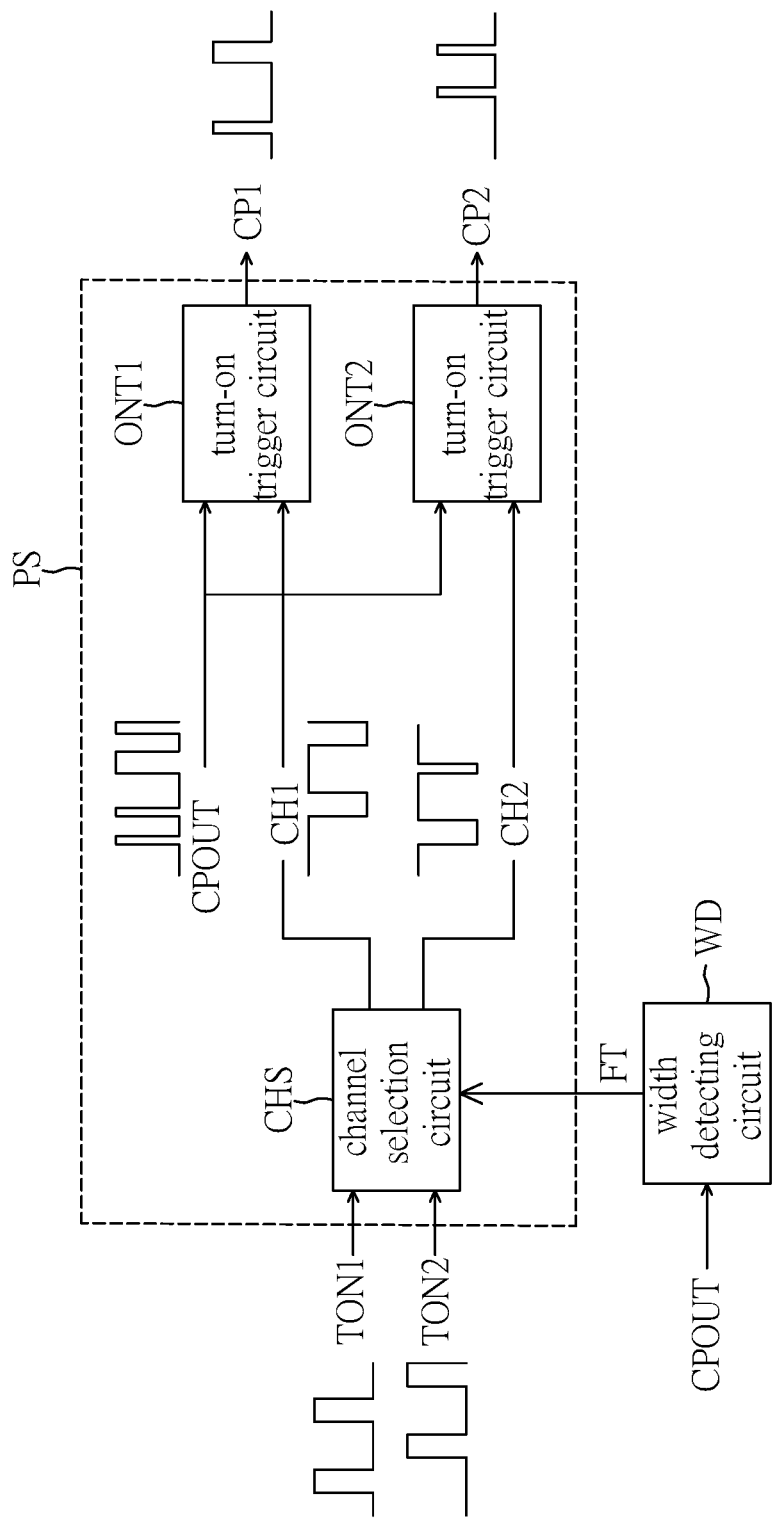
FIG. 2 is a circuit diagram of a phase selection circuit and a width detection circuit according to an embodiment of the present disclosure.

An example for the phase selection circuit PS and the width detecting circuit WD is provided below. Reference is made to FIG. 2, which is a circuit diagram of a phase selection circuit and a width detection circuit according to an embodiment of the present disclosure. As shown, the phase selection circuit PS may include a channel selection circuit CHS and a plurality of turn-on trigger circuits, such as turn-on trigger circuits ONT1 and ONT2, and a number of turn-on trigger circuits corresponds to a number of phases of the multi-phase DC-DC power converter 1.

Here, the channel selection circuit CHS is configured to output, in response to the plurality of turn-on signals, such as the turn-on signals TON1 and TON2, the plurality of turn-on trigger signals, such as the turn-on trigger signals CH1 and CH2, and the turn-on trigger signals CH1 and CH2 are each associated with the phases of the multi-phase DC-DC power converter 1. On the other hand, the turn-on trigger circuits ONT1 and ONT2 respectively receive the turn-on trigger signals CH1 and CH2, and the comparison output signals CPOUT, and correspondingly output the phase signals CP1 and CP2.

Therefore, in the load transition state, when the width detecting circuit WD detects that the comparison output signal CPOUT exceeds the predetermined width, the width detecting circuit WD generates the force trigger signal FT to be input to the channel selecting circuit CHS, and the channel selecting circuit CHS replaces one of the turn-on signals with the force trigger signal FT, such as the turn-on trigger signal CH1 or CH2, and correspondingly adjusts one of the plurality of phase signals, such as the phase signal CP1 or CP2.

Figure 3:
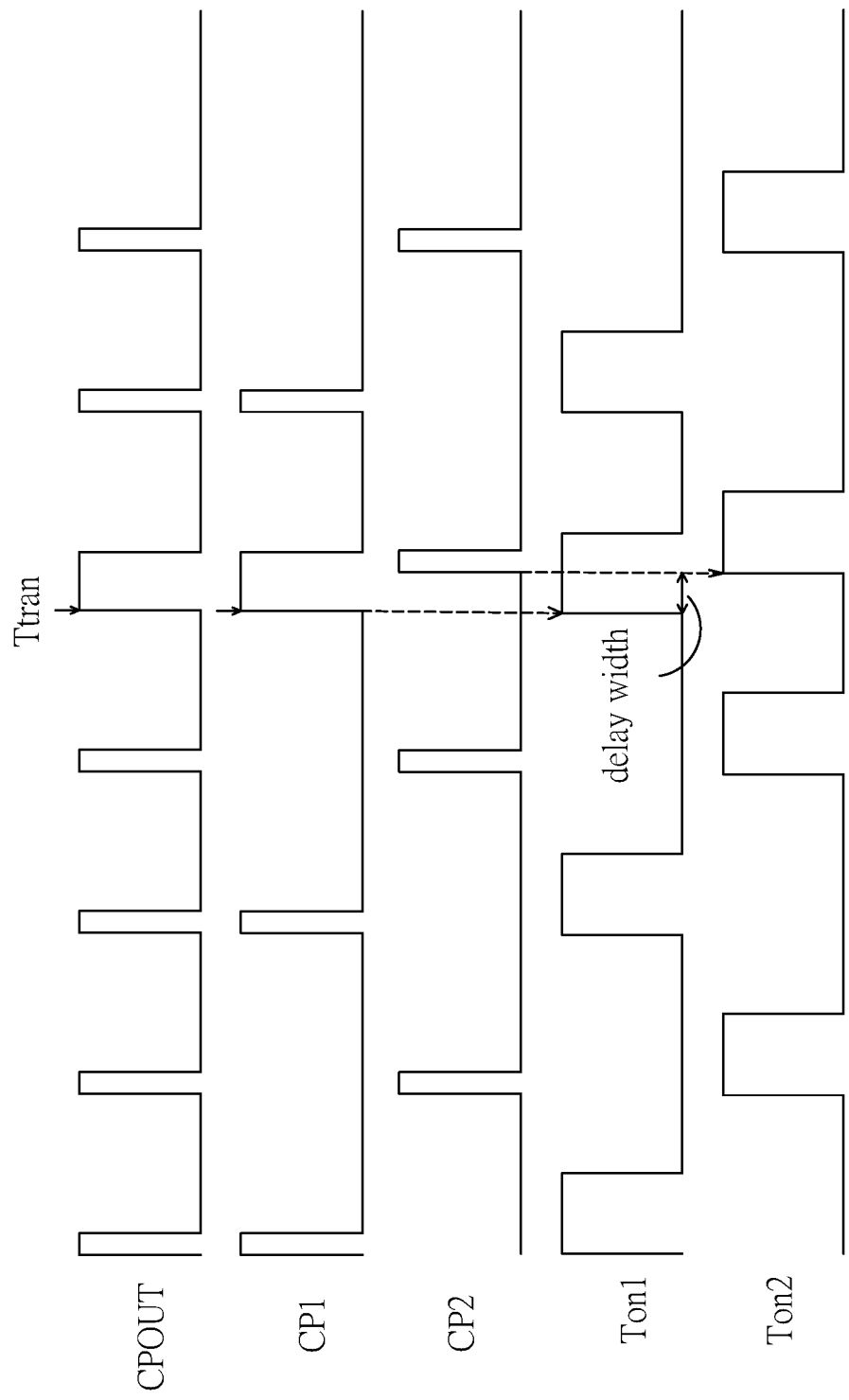
FIG. 3 is a timing diagram of signals showing a comparison output signal, a phase signal, and a turn-on clock signal according to an embodiment of the present disclosure.

For more details, reference is made to FIG. 3, which is a timing diagram of signals showing a comparison output signal, a phase signal, and a turn-on clock signal according to an embodiment of the present disclosure. As shown in FIG. 3, before a load transition timing Ttran, the comparison output signal CPOUT is separated into regular phase signals CP1 and CP2 via the phase selection circuit PS, and the turn-on clock signals Ton1 and Ton2 are triggered by the phase signals CP1 and CP2 to turn on each of the phase circuits.

After the load transition timing Ttran, when the width detecting circuit WD detects that the comparison output signal CPOUT exceeds the predetermined width, the width detecting circuit WD generates the force trigger signal FT to be input to the channel selecting circuit CHS, and the channel selecting circuit CHS replaces the turn-on trigger signal CH2 with the force trigger signal FT, thereby generating the advanced phase signal CP2. Therefore, in the case where the phase signal CP2 is triggered, the advanced turn-on clock signal Ton2 is generated to turn on the second phase circuit 11. Thus, since the second phase circuit 11 is turned on in advance, an inductor current IL2 can be used to compensate a level of the voltage drop of the output voltage VOUT, thereby significantly reducing the voltage drop generated during the load transition.

Figure 4:
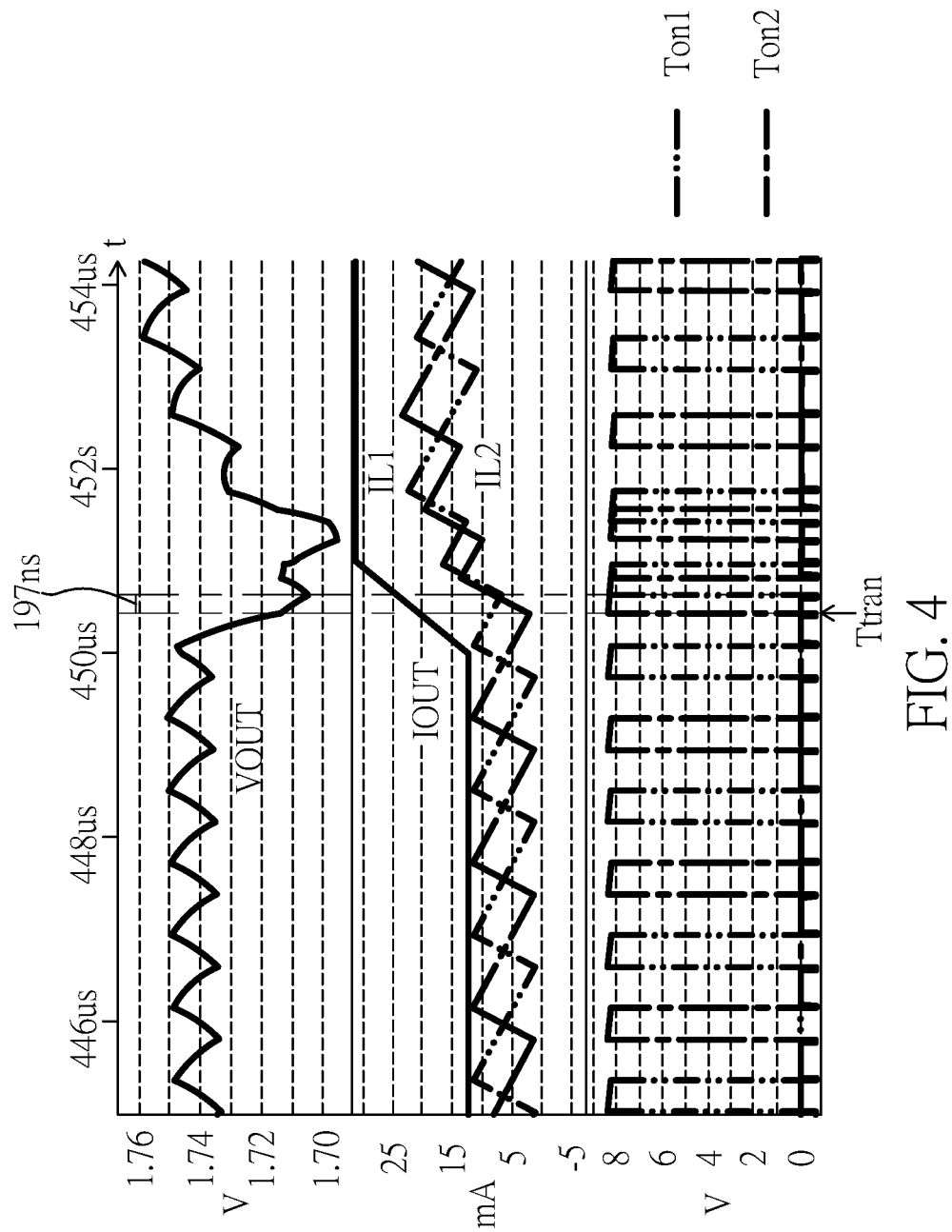
FIG. 4 is a signal waveform diagram showing an output voltage, an output current, an inductor current, and a turn-on clock signal in a load transition state according to an embodiment of the present disclosure.

Reference is made to FIG. 4, which is a signal waveform diagram showing an output voltage, an output current, an inductor current, and a turn-on clock signal in a load transition state according to an embodiment of the present disclosure. As shown in FIG. 4, the predetermined width is set to be about 200 us under operating conditions of input voltage 5.4V, output voltage 1.8V, output current 12 A~31 A/us, output inductor 0.22 uH, output capacitor type 22 uF×8, comparator internal resistance 100Ω and comparator capacitor 470 pF. As shown, when the width detecting circuit WD detects that the comparison output signal CPOUT exceeds the predetermined width after the load transition timing Ttran, the width detecting circuit WD generates the force trigger signal FT to be input to the channel selecting circuit CHS, and further makes the second phase circuit 11 to be turned on in advance. It can be seen that the inductor current IL2 rises in advance, and the overall voltage drop is suppressed to about 46 mV.

Figure 5:
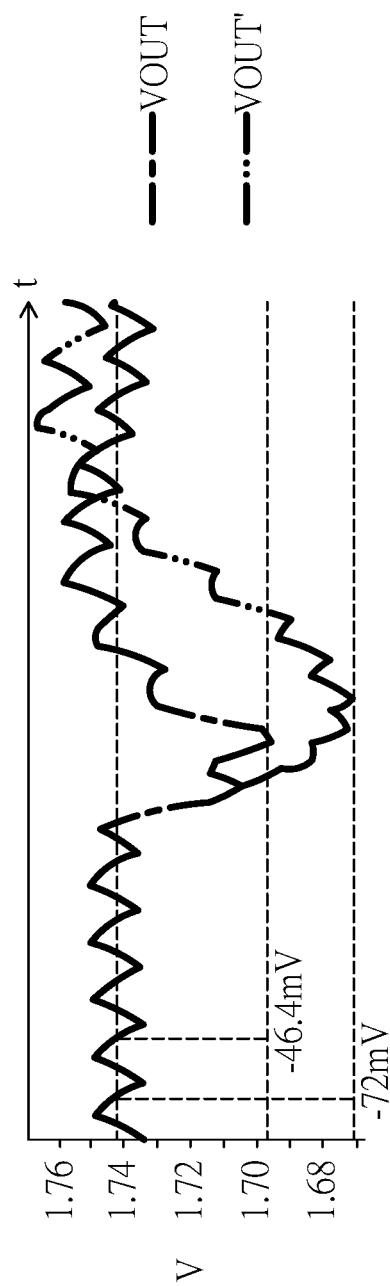
FIG. 5 is an output voltage waveform diagram showing a comparison between the multi-phase DC-DC power converter according to the embodiment of the present disclosure and an existing power converter after the load transition state.

Reference is made to FIG. 5, which is an output voltage waveform diagram showing a comparison between the multi-phase DC-DC power converter according to the embodiment of the present disclosure and an existing power converter after the load transition state. As shown in FIG. 5, the output voltage VOUT of the multi-phase DC-DC power converter of the embodiment of the present disclosure is compared with a output voltage VOUT' of the existing power converter, after the load transition state, a voltage drop rate of the output voltage VOUT' of the existing power converter is 72 mv/1746 mv=4.1%, while a voltage drop rate of the output voltage VOUT of the multi-phase DC-DC power converter of the embodiment of the present disclosure is 46 mv/1746 mv=2.6%. It can be seen that the voltage drop is reduced about 26 mV, and at least 1.5% of voltage drop rate can be reduced.

Figure 6:
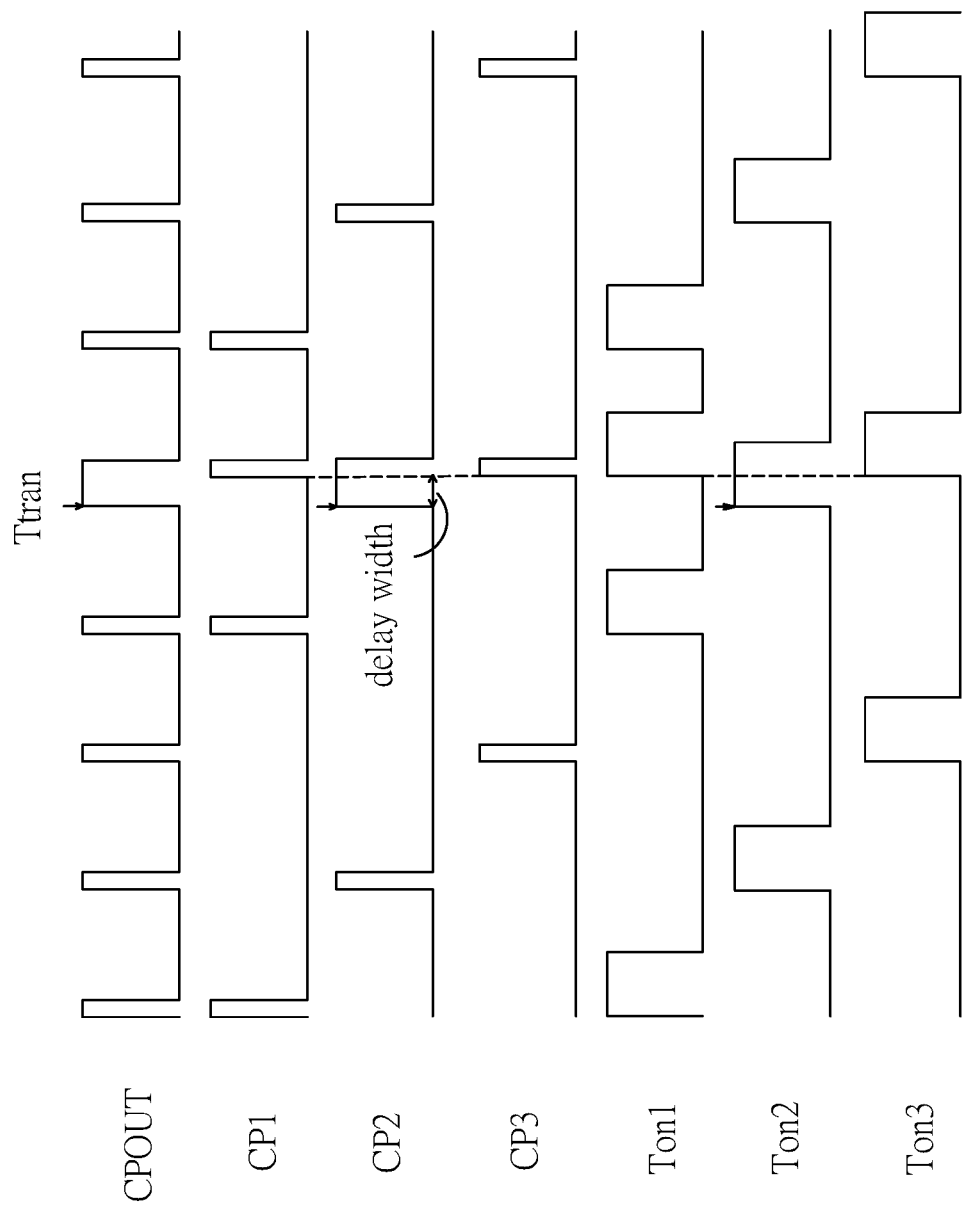
FIG. 6 is a timing diagram of signals showing a comparison output signal, a phase signal, and a turn-on clock signal according to another embodiment of the present disclosure.

Reference is made to FIG. 6, which is a timing diagram of signals showing a comparison output signal, a phase signal, and a turn-on clock signal according to another embodiment of the present disclosure. As shown, a mechanism of the present disclosure can be further extended to three-phase DC-DC power converters. Similarly, before the load transition timing Ttran, the comparison output signal CPOUT is separated into regular phase signals CP1, CP2 and CP3 via the phase selection circuit PS, and turn-on clock signals Ton1, Ton2 and Ton3 are triggered by the phase signals CP1, CP2 and CP3 to turn on each of the phase circuits.

After the load transition timing Ttran, when the width detecting circuit WD detects that the comparison output signal CPOUT exceeds the predetermined width, the width detecting circuit WD generates the force trigger signal FT to be input to the channel selecting circuit CHS. Here, when the width detection circuit WD detects that the comparison output signal CPOUT exceeds a predetermined width in the load transition state, the channel selection circuit CHS is further configured to distinguish, according to a turn-on sequence of the turn-on signals, a current turn-on signal and an adjacent turn-on signal after the current turn-on signal from the turn-on signals, and replace the adjacent turn-on signal with the force trigger signal FT. In this embodiment, the channel selection circuit CHS determines that the current turn-on signal is a signal associated with the phase signal CP2 according to the turn-on sequence, and determines that the adjacent turn-on signal after the current turn-on signal is a signal associated with the phase signals CP1 and CP3, therefore, the forced trigger signal FT is used to replace the related signals of the phase signals CP1 and CP3, that is, the turn-on trigger signals CH2 and a turn-on trigger signal of the phase signal CP3, so as to generate advanced phase signals CP1 and CP3. Therefore, in the case where the phase signals CP1 and CP3 are triggered, the advance turn-on clock signals Ton1 and Ton3 are generated to turn on the first phase circuit 10 and the third phase circuit. Thus, since the first phase circuit 10 and the third phase circuit are turned on in advance, inductor currents can be used to compensate a level of the voltage drop of the output voltage VOUT, thereby significantly reducing the voltage drop generated during the load transition.

Figure 7:
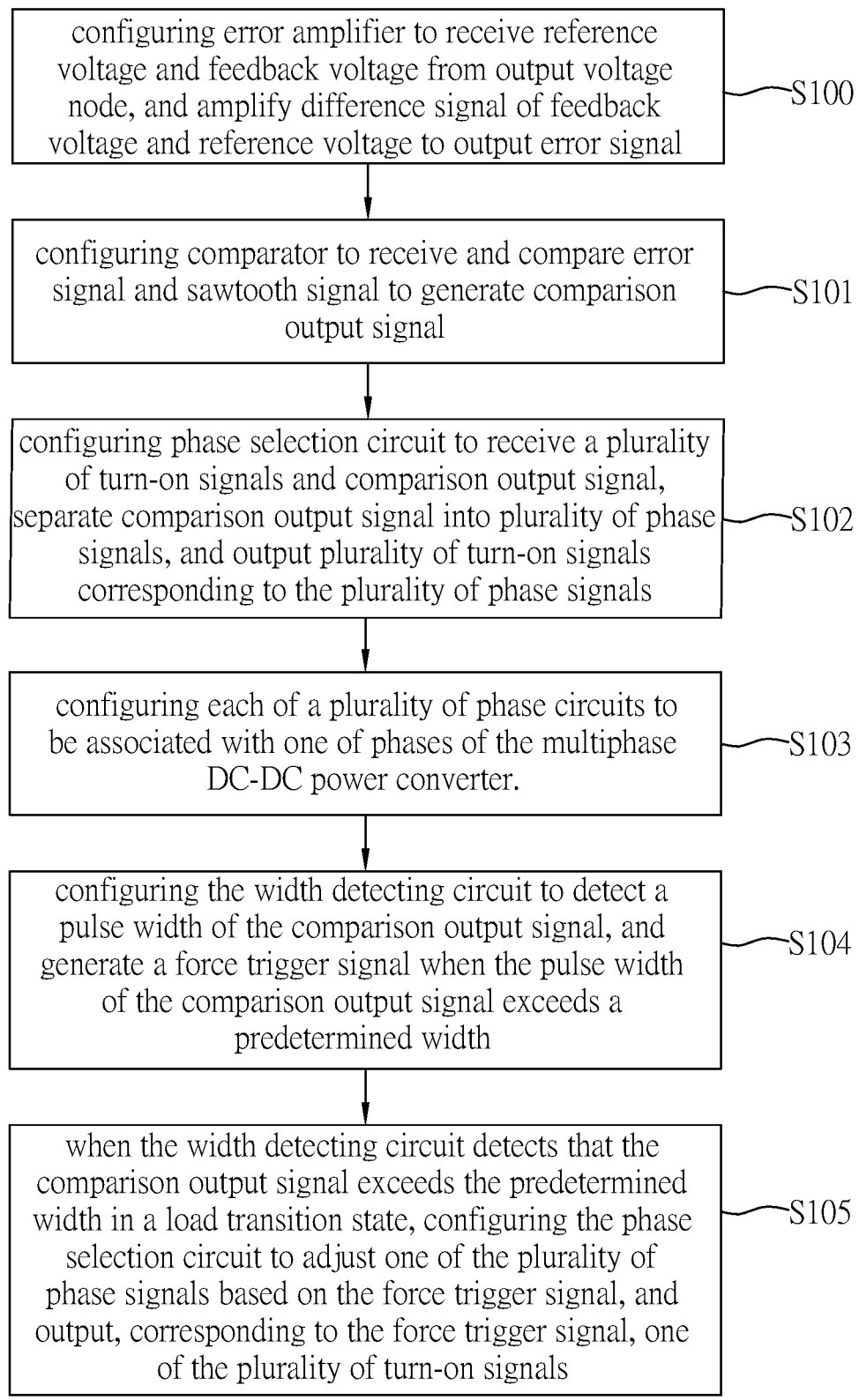
FIG. 7 is a flowchart of a driving method of a multi-phase DC-DC power converter according to still another embodiment of the present disclosure.

Reference is made to FIG. 7, another embodiment of the present disclosure provides a driving method of a multi-phase DC-DC power converter. In the present embodiment, the driving method is applied to the embodiments shown in FIGS. 1 to 6, but is not limited thereto. The driving method of the multi-phase DC-DC power converter includes at least the following steps:

Step S100: configuring an error amplifier to receive a reference voltage and a feedback voltage from an output voltage node, and amplify a difference signal of the feedback voltage and the reference voltage to output an error signal.

Step S101: configuring a comparator to receive and compare the error signal and a sawtooth signal to generate a comparison output signal.

Step S102: configuring a phase selection circuit to receive a plurality of turn-on signals and a comparison output signal, separate the comparison output signal into a plurality of phase signals, and output the plurality of turn-on signals corresponding to the plurality of phase signals.

Step S103: configuring each of a plurality of phase circuits to be associated with one of phases of the multiphase DC-DC power converter. Here, the plurality of phase circuits each includes a turn-on clock generation circuit, a first switch transistor, a second switch transistor, an output inductor, a zero-crossing detection circuit, and a control logic. The above components have been described in the above embodiments, and thus the repeated description is omitted.

Step S104: configuring the width detecting circuit to detect a pulse width of the comparison output signal, and generate a force trigger signal when the pulse width of the comparison output signal exceeds a predetermined width.

Step S105: when the width detecting circuit detects that the comparison output signal exceeds the predetermined width in a load transition state, configuring the phase selection circuit to adjust one of the plurality of phase signals based on the force trigger signal, and output, corresponding to the force trigger signal, one of the plurality of turn-on signals.

One of the advantages of the present disclosure is that the multi-phase DC-DC power converter and the driving method thereof provided by the present disclosure can greatly reduce a voltage drop during the load transition by detecting the pulse width of the comparison output circuit and adjusting a turn-on timing of the phase circuit.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A multi-phase DC-DC power converter, comprising:
   an error amplifier configured to receive a reference voltage and a feedback voltage from an output voltage node, and amplify a difference signal of the feedback voltage and the reference voltage to output an error signal;
   a comparator configured to receive and compare the error signal and a sawtooth signal to generate a comparison output signal;
   a phase selection circuit including:
      a channel selection circuit configured to receive a plurality of turn-on signals and output, in response to the plurality of turn-on signals, a plurality of turn-on trigger signals, wherein the plurality of turn-on trigger signals are each associated with one phase of the multi-phase DC-DC power converter; and
      a plurality of turn-on trigger circuits configured to respectively receive the turn-on trigger signals and the comparison output signals, and correspondingly output a plurality of phase signals;
   a plurality of phase circuits each associated with one of the phases of the multiphase DC-DC power converter, each including:
      a turn-on clock generation circuit configured to generate a turn-on clock signal in response to one of the plurality of turn-on signals;
      a first switching transistor responsive to a switching signal and coupled between an input voltage node and a phase node;
      a second switching transistor responsive to another switching signal and connected between the phase node and a ground node;
      an output inductor coupled between the output voltage node and the phase node; and
      a control logic configured to generate, in response to the turn-on clock signal, the switching signals; and
   a width detecting circuit configured to detect a pulse width of the comparison output signal, and generate a force trigger signal when the pulse width of the comparison output signal exceeds a predetermined width;
   wherein in a load transition state, when the width detecting circuit detects that the comparison output signal exceeds the predetermined width, the channel selection circuit adjusts one of the plurality of turn-on signals based on the force trigger signal, and one of the plurality of turn-on trigger circuits outputs, corresponding to the force trigger signal, one of the plurality of phase signals.

2. The multi-phase DC-DC power converter according to claim 1, wherein in the load transition state, when the width detecting circuit detects that the comparison output signal exceeds the predetermined width, the width detection circuit is configured to generate the force trigger signal, and the channel selection circuit is configured to replace one of the turn-on signals with the force trigger signal, and correspondingly adjust one of the phase signals.

3. The multi-phase DC-DC power converter of claim 2, wherein the turn-on signals are ordered in a turn-on sequence, and wherein in the load transition state, when the width detection circuit detects that the comparison output signal exceeds the predetermined width, the channel selection circuit is configured to distinguish, according to the turn-on sequence, a current turn-on signal and an adjacent turn-on signal after the current turn-on signal from the turn-on signals, and replace the adjacent turn-on signal with the force trigger signal.

4. A driving method of a multi-phase DC-DC power converter, comprising:
   configuring an error amplifier to receive a reference voltage and a feedback voltage from an output voltage node, and amplifying a difference signal of the feedback signal and the reference voltage to output an error signal;
   configuring a comparator to receive and compare the error signal and a sawtooth signal to generate a comparison output signal;
   configuring a channel selection circuit of a phase selection circuit to receive a plurality of turn-on signals and output, in response to the plurality of turn-on signals, a plurality of turn-on trigger signals, wherein the plurality of turn-on trigger signals are each associated with one phase of the multi-phase DC-DC power converter;
   configuring a plurality of turn-on trigger circuits of the phase selection circuit to respectively receive the turn-on trigger signals and the comparison output signals, and correspondingly output a plurality of phase signals;
   configuring each of a plurality of phase circuits to be associated with one of phases of the multiphase DC-DC power converter, wherein the plurality of phase circuits each includes:
      a turn-on clock generation circuit configured to generate a turn-on clock signal in response to one of the plurality of phase signals;
      a first switching transistor responsive to a switching signal and coupled between an input voltage node and a phase node;
      a second switching transistor responsive to another switching signal and coupled between the phase node and a ground node;
      an output inductor coupled between the output voltage node and the phase node; and
      a control logic configured to generate, in response to the turn-on clock signal, the switching signals;
   configuring a width detecting circuit to detect a pulse width of the comparison output signal, and generate a force trigger signal when the pulse width of the comparison output signal exceeds a predetermined width; and
   when the width detecting circuit detects that the comparison output signal exceeds the predetermined width in a load transition state, configuring the channel selection circuit to adjust one of the plurality of turn-on signals based on the force trigger signal; and
   configuring one of the plurality of turn-on trigger circuits to output, corresponding to the force trigger signal, one of the plurality of turn-on signals.

5. The driving method of the multi-phase DC-DC power converter according to claim 4, further comprising:
   when the width detecting circuit detects that the comparison output signal exceeds the predetermined width in the load transition state, configuring the width detecting circuit to generate the forced trigger signal; and
   configuring the channel selection circuit to replace one of the turn-on signals with the force trigger signal, and correspondingly adjust one of the phase signals.

6. The driving method of the multi-phase DC-DC power converter according to claim 5, further comprising:

when the width detection circuit detects that the comparison output signal exceeds the predetermined width in the load transition state, configuring the channel selection circuit to distinguish, according to a turn-on sequence of the turn-on signals, a current turn-on signal and an adjacent turn-on signal after the current turn-on signal from the turn-on signals, and replace the adjacent turn-on signal with the force trigger signal.

* * * * *